United States Patent [19]

Spencer

[11] Patent Number: 4,576,238

[45] Date of Patent: Mar. 18, 1986

[54] FOLDING OUTRIGGER ATTACHMENT FOR FARM IMPLEMENTS

[75] Inventor: Michael L. Spencer, Jonesboro, Ark.

[73] Assignee: Marliss Industries, Inc., Jonesboro, Ark.

[21] Appl. No.: 525,118

[22] Filed: Aug. 22, 1983

[51] Int. Cl.[4] ............................................. A01B 73/00
[52] U.S. Cl. ................................. 172/311; 280/411 R
[58] Field of Search ............... 172/311, 446, 456, 466, 172/662, 776, 457, 502; 280/476 A, 476 R, 411 R, 411 A

[56] References Cited

U.S. PATENT DOCUMENTS

| | | | |
|---|---|---|---|
| 3,360,053 | 12/1967 | Doepker | 172/311 X |
| 3,491,836 | 1/1970 | Doepker | 172/311 |
| 3,982,773 | 9/1976 | Stafflebeam | 172/456 |
| 4,117,892 | 10/1978 | Dietrich, Sr. et al. | 172/311 |
| 4,117,893 | 10/1978 | Kinzenbaw | 172/311 |
| 4,204,575 | 5/1980 | Richardson et al. | 172/311 X |
| 4,211,288 | 7/1980 | Applequist | 172/240 X |
| 4,319,643 | 3/1982 | Carter | 172/311 |
| 4,355,689 | 10/1982 | Friggstad | 172/311 |

Primary Examiner—Richard J. Johnson
Attorney, Agent, or Firm—Allegretti, Newitt, Witcoff & McAndrews, Ltd.

[57] ABSTRACT

A multisection farm implement includes a center carriage or center section and attached wing or outrigger sections. The wing sections are suspended from the carriage by means of a special hinge assembly which includes a first hinge couple for rotation about a horizontal axis so that the wing section may follow the contour of the field or be supported as a cantilever and a second hinge couple for rotation about a vertical axis so that the wing section may be folded between a field operating position and a road travel position.

9 Claims, 7 Drawing Figures

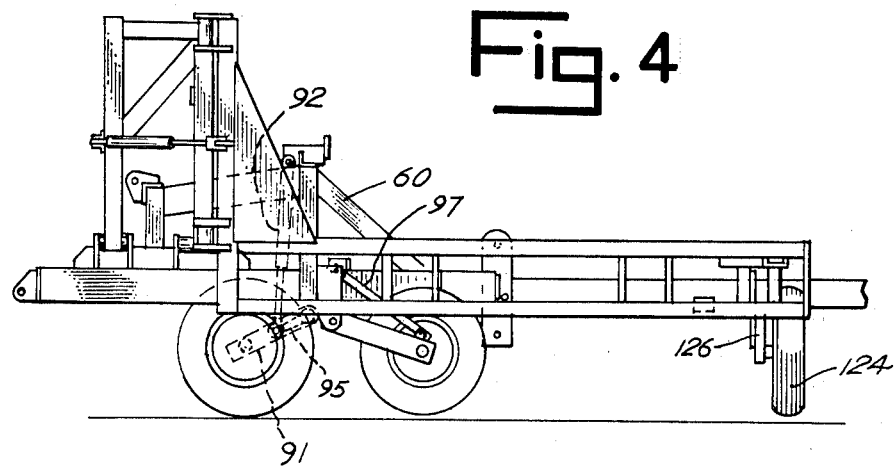
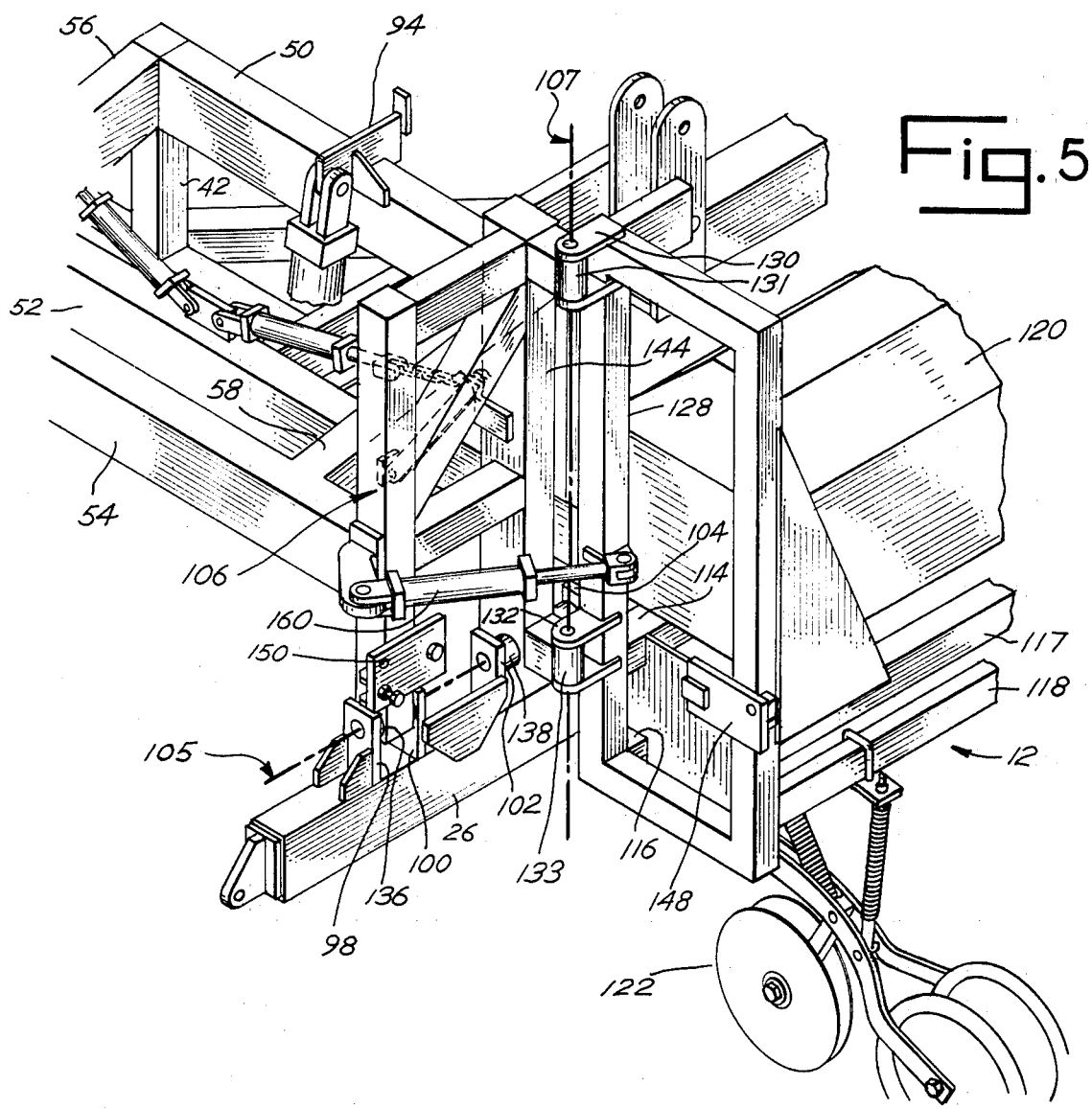

FOLDING OUTRIGGER ATTACHMENT FOR FARM IMPLEMENTS

BACKGROUND OF THE INVENTION

This invention relates to an improved foldable implement and more particularly to an improved foldable, outrigger attachment construction for a farm implement.

Cultivation of soil with tools such as plows, rakes, discs, planters, grain drills, and the like has normally been accomplished by towing or pulling the tools through a field along a path or swath. The tools are generally mounted on a tool bar or implement which is towed by a prime mover such as a tractor. As agricultural science and mechanical science have improved, the size of the path or swath cultivated has been increased by using larger and larger implements. The size of many implements has increased immensely in recent years. This has resulted in increased efficiency and higher productivity by farmers. Farmers are thus able to cultivate much larger areas of land.

A problem has resulted, however, with the use of larger and larger implements; namely very large implements may not efficiently follow the contour of the soil being cultivated. This problem was recognized, for example, in Broemmelsick, et al, U.S. Pat. No. 1,938,132 issued Dec. 5, 1933 for l"Agricultural Apparatus". U.S. Pat. No. 1,938,132 depicts an articulated, multisection planter implement wherein a series of planters are arranged side by side and are connected to one another by an articulated toolbar. The toolbar includes hinges connecting the separate segments of te implement as well as a universal joint which connects the axles of the running gear for the implement. The device is thus adapted to follow the contour of soil.

While a large articulated implement effectively cultivates a large swath, such equipment is extremely difficult to transport between fields or along country roads and also requires large indoor storage space. Thus, another problem to be solved was how to fold a farm implement into a size that can be easily transported from field to field and easily stored. Various approaches, depending upon the type of implement, have been suggested with respect to the folding of farm implements such as set forth in the disclosures of the following patents:

| Reg. No. | Inventor | Title |
| --- | --- | --- |
| 3,454,285 | Van Peursem | Offset Actuated Hitch |
| 3,505,704 | Hornung, et al | Hinge for Transverse Relative Movement for Frame Structures |
| 3,529,674 | Todd, et al | Foldable Multiple Section Earthworking Implement |
| 3,544,131 | Pennington | Implement Frame |
| 3,680,648 | Tonsfeldt | Row Crop Cultivator |
| 3,698,488 | Yoder, et al | Field Conditioner |
| 3,983,944 | Farrant | Trailer Plough With Hinged Boom Parts |
| 4,171,022 | Applequist | Foldable Construction for Agricultural Implements |
| 4,211,288 | Applequist | Raisable Implement Frame With Operably Connected Wheel and Draft Frames |
| 4,214,637 | Applequist | Elevation Altering Structure for Agricultural Implements |
| Canadian 645,292 | Sweet | Multiple Gang Discer |
| French Patent No. 2,302,011 | | |

Some of the aforesaid patents are merely representative of apparatus which will fold. Other patents combine the features of folding and articulation. For example, Applequist U.S. Pat. No. 4,171,022 illustrates such a combination.

Additional patents which illustrate the combination of articulation and foldability include Sinkule, et al, U.S. Pat. No. 3,523,699 and Newhouse, U.S. Pat. No. 3,487,883. In the Sinkule et al patent, an implement frame is supported at its opposite ends by running gear. The center of the implement folds and may also be raised and lowered by operation of hydraulic cylinders. The center portion of the implement carrier is additionally connected by hinges to a center support bar or tow bar.

Many of the prior art constructions are not suited for cantilever support of outrigger sections. Also, many of the prior art constructions are not suited for use with heavy tools such as grain drills. The present invention overcomes such prior art shortcomings.

SUMMARY OF THE INVENTION

Briefly, the present invention relates to an improved multisectioned implement carrier having a center carriage with attached wing or outrigger sections. The wing sections are supported by the center carriage so that running gear may be eliminated particularly for road travel of the wing sections. The center carriage also supports various tools. The wing sections are attached to the center carriage by an articulated, folding connection which permits the wing sections to follow the contour of the cultivated soil independently of the center carriage and also permits folding of the wing sections with respect to the center carriage. Thus, the present invention provides an improved, multisectioned implement having an improved connection between a center carriage section and attached wing sections.

The connection between the center carriage section and the wing section is effected by means of two separate, but connected hinge couples. One of the hinge couples permits pivotal motion about a horizontal axis extending generally in the direction of implement field travel while the other couple permits movement of the wing section about a vertical axis between a folded position and a field operation position.

Thus, it is an object of the invention to provide an improved multisection, tool carrier or implement.

It is a further object of the present invention to provide a multisection tool carrier which is foldable between a field operating position and a transport position.

Still another object of the present invention is to provide a multisection carrier which is articulated in order that the separate sections may independently follow the contour of a field during field operation.

Another object of the invention is to provide a rugged connection assembly between outrigger sections and a center carriage of a multisection farm implement.

Still a further object of the invention is to provide a reliable, efficient, and simplified multisection farm implement.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is a side elevation of the implement depicted in FIG. 2;

FIG. 5 is an enlarged perspective view of the hinge assembly of the invention which connects the outrigger or wing section to the center carriage;

DESCRIPTION OF THE PREFERRED EMBODIMENT

General Description

Figure 1:
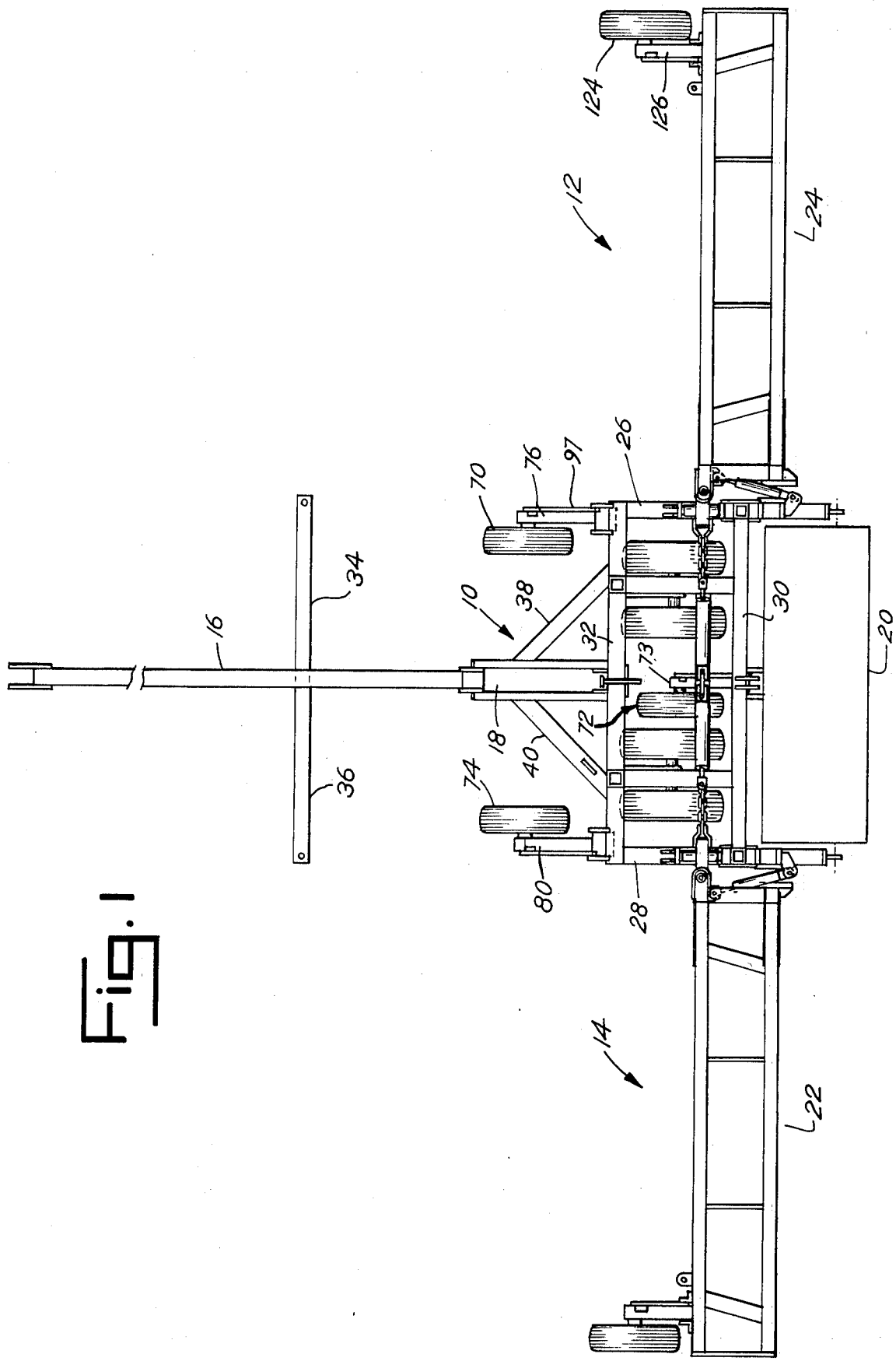
FIG. 1 is a top plan view of the improved implement of the invention in the field position.

The implement of the present invention, as depicted in FIGS. 1-4, incorporates the invention in a grain drill planting implement. The grain drill implement is comprised of a center carriage section 10, a right hand outrigger or wing section 12, and a left hand outrigger or wing section 14. The center or carriage section 10 is towed by a floating or pivotal draw bar 16 attached to the forward end of a frame tongue 18 extending from the carriage section 10. The wing sections 12, 14 fold relative to the center carriage section 10 between the positions shown in FIGS. 1 and 2.

In the embodiment shown, the center carriage section 10 as well as the wing sections 12, 14 incorporate drill tools for the planting of seeds such as soy bean or grain seeds. Thus, the center carriage section 10 includes a grain drill assembly 20 attached by means of a three point hitch to the center carriage section 10. The wing section 12 includes grain drills 22 and the wing section 14 includes grain drills 24 mounted on tool bars which comprise the wing sections 12, 14, respectively.

Center Carriage Section

Figure 2:
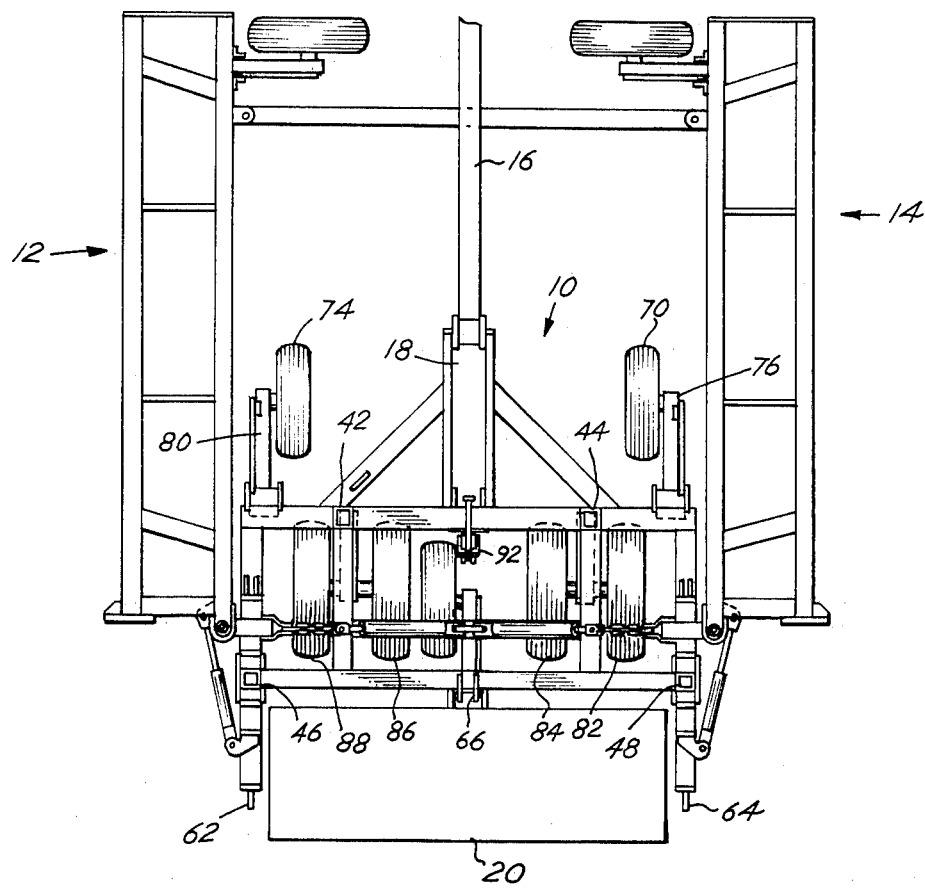
FIG. 2 is a top plan view of the implement of the present invention in the travel or storage position.

FIGS. 1-4 provide further details of the construction of the center carriage section 10. The carriage section 10 includes a frame comprised of side frame members 26, 28 which are connected by rear and forward main cross frame members 30, 32, respectively. All the frame members comprising the center carriage, including members 26, 28, 30, 32, are preferably fabricated from tubular steel beams of appropriate cross section. The frame tongue member 18 is welded to the forward cross frame member 32 and projects forwardly along the center line axis 33 of the carriage section 10. A floating drawbar or tongue 16 is pivotally connected about a horizontal axis transverse to the direction of movement of section 10 to the frame tongue member 18. Tongue 16 includes laterally projecting wing section support members 34, 36. The wing section support members 34, 36 are used when the wing sections 12, 14 are in the folded position such as shown in FIG. 2. The tongue 16 connects the frame tongue member 18 with a prime mover such as a tractor or the like (not shown) so that the center carriage section 10 along with all of its attachments may be moved or pulled through a field. The frame tongue member 18 is maintained in position by braces 38, 40 which connect from the tongue member 18 to the forward cross frame member 32.

A carriage section superstructure assembly is comprised of upright beams 42, 44, 46, 48 that project vertically from the cross frame members 30, 32 to support a series of elevated cross beams 50, 52, 54 and lateral beams 56, 58. A brace 60 connects from the frame tongue member 18 to the elevated forward cross beam 54. Various other brace beams may optionally be included to strengthen the overall carriage section 10 and superstructure assembly.

A three point hitch or tool support bracket assembly is incorporated on the backside of the center carriage section or frame 10. The three point hitch assembly includes two lower tool support brackets 62, 64 and an upper bracket 66. A grain drill assembly 20 is supported by the three point hitch brackets 62, 64, 66. In this manner the center carriage section 10 provides or defines a portion of the operating swath of the implement in the field.

The center carriage section 10 includes two gauges wheels 70, 74 which are supported by gauge wheel brackets 76, 80, respectively attached to appropriate frame members. The brackets 76, 80 maintain the gauge wheels 70, 74 at fixed elevations with respect to the frame that defines the carriage section 10. The particular elevation or level is, however, adjustable by varying the length of a connecting link 97. A third gauge wheel 72 is attached by a bracket 78 to grain drill assembly 20 for construction 10. It will be noted that gauge wheels 70, 74 are situated on opposite sides of section 10 and project from the forward cross beam 32, and the gauge wheel 72 projects from the assembly 20 and lies on the center line axis of the carriage section 10 in line with the frame tongue member 18. This provides for stability of the carriage section 10 as it is operated in the field and generally supports the drill assembly 20 or other tool in a desired or level condition as the implement is drawn through a field.

Figure 3:
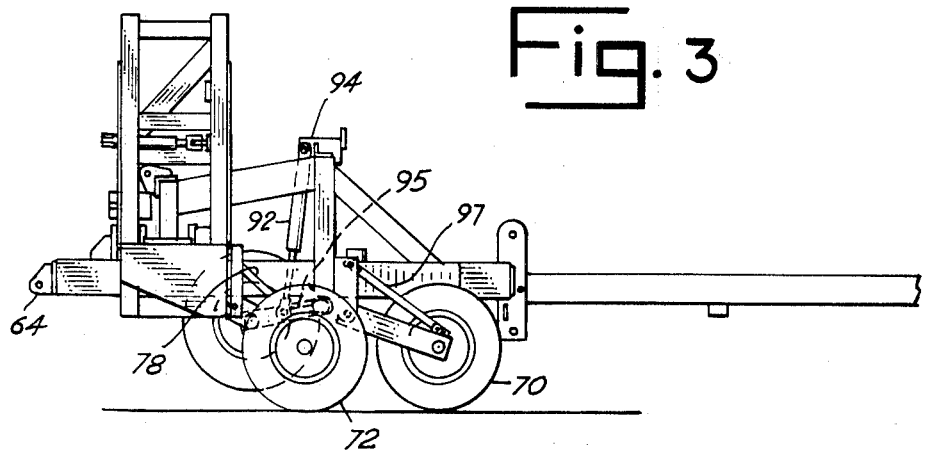
FIG. 3 is a side elevation of the implement depicted in FIG. 1.
Figure 6:
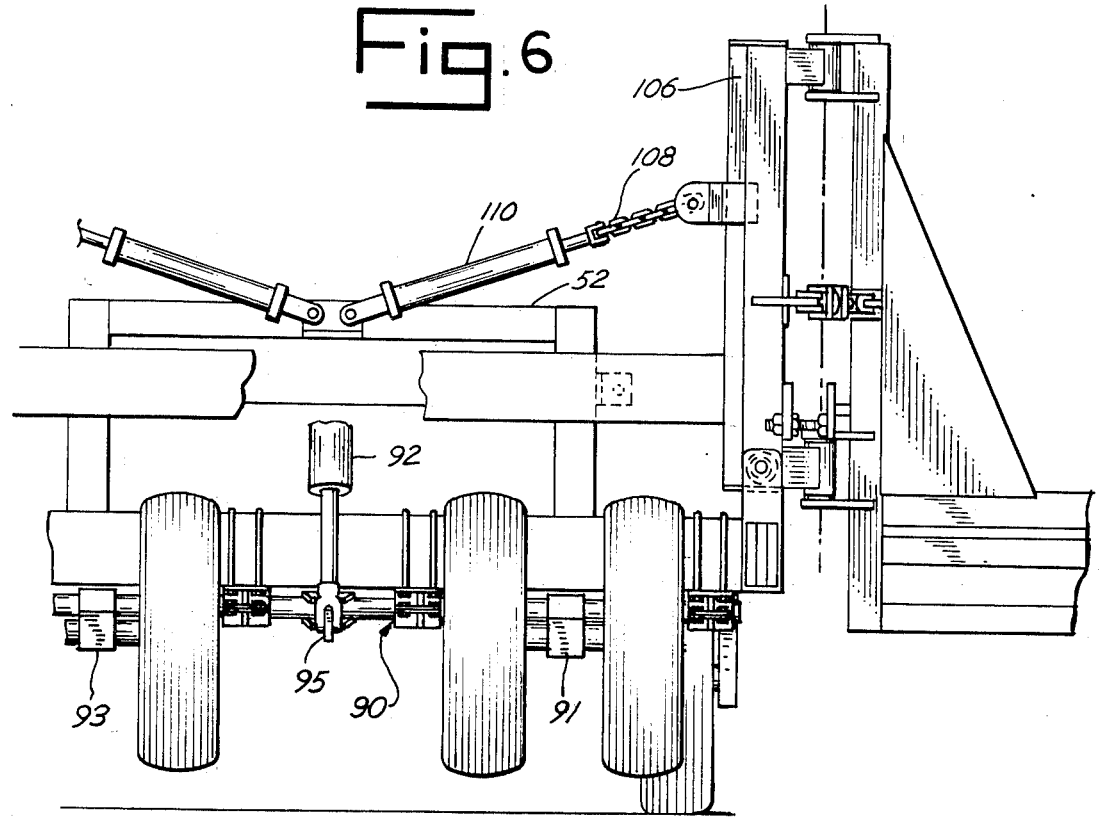
FIG. 6 is an elevation of the hinge assembly in the field or operation position.
Figure 7:
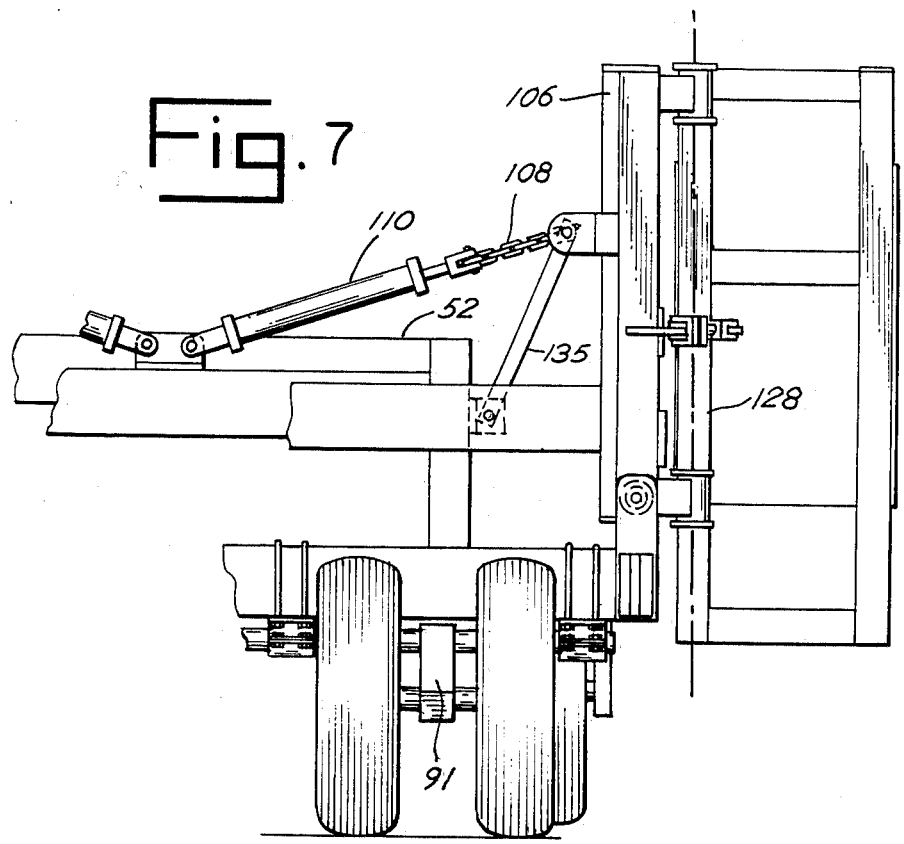
FIG. 7 is an elevation of the hinge assembly in the road travel position.

The center carriage section 10 also includes four carriage wheels which may be rasised or lowered. Thus, carriage wheels 82, 84, 86, 88 are mounted on a pivotal carriage rack or axle 90 which moves in response to operation of a carriage wheel hydraulic cylinder 92 connected between a cylinder bracket 94 on cross beam 50 and the rack 90. In particular, the axle 90 is journaled in side brackets 91, 93 which are, in turn, pivotally mounted on side beam members 26, 28 respectively. The cylinder 92 connects to a link 95 in FIGS. 2, 3, and 6 is attached to the axle 90. The cylinder then operates the axle and raises the wheels 82, 84, 86, 88 and thus lower the carriage section 10 when the implement is operated in the field. During travel between fields or when in storage, it is common to lock the wings 12, 14 in a raised position by link 135 and operate the cylinder 92 so as to lower the wheels thus raising the entire carriage section 10 and attached wing sections 12, 14. The height of the carriage section 10 may be adjusted by varying the stroke of cylinder 92.

Each side frame member 26, 28 includes a hinge leaf assembly which comprises part of a first hinge couple. Thus, side frame member 26 includes hinge brackets 98, 100 which define a first leaf and hinge brackets 102 and 104 which define another leaf of a first hinge couple. The brackets 98, 100, 102, 104 cooperate with a hinge bracket 106. Bracket 106 in turn cooperates with wing section 12. Hinge bracket 106 is connected by a flexible link or chain 108 to a hydraulic cylinder 110 which is affixed to a bracket 112 attached to the center cross beam 52 to raise and lower wing section 12.

Wing Sections

The following description of a wing section will be directed primarily to wing section 12. This results since the wing sections 12, 14 associated with the implement of the invention are substantially mirror images in the embodiment shown. However, the invention is not to be limited to the particular structure of the wing section nor is the invention to be limited to the number of wing sections to be included in the implement. Thus, the wing sections 12, 14 may be of distinct design, distinct size, or one of the wing sections may be omitted totally from the implement.

Referring to the figures therefore, the wing section 12 is comprised of a series of structural frame members 114, 116, 117, 118 which extend laterally from the carriage section 10 when the wing section 12 is in the field operating position as shown in FIG. 1. The frame members 114, 116, 117, 118 support a grain drill assembly which includes a hopper 120 and grain drills 122 beneath the hopper 120 which are attached to one of the frame members 118. Hopper 120 and grain drills 122 associated with the wing section 12 are substantially identical in construction to the grain drill assembly 20 associated with the carriage center section 10. A gauge wheel 124 is attached by a bracket 126 at the outside end of wing section 12.

The inside end of wing section 12 includes a portion of a second hinge couple associated with a vertical hinge beam 128 attached to the frame members 114 and 116. Beam 128 includes hinge brackets 130, 132 which each define a pair of spaced leaves associated with the second hinge couple. The brackets 130 and 132 cooperate with associated leaves 131, 133 that are attached to the main hinge bracket 106.

Hinge Assembly

An important aspect of the invention is the hinge assembly which includes the hinge bracket 106 and is interconnection between the wing section 12 and carriage section 10. Reference is particularly directed to FIGS. 3–7 in this regard. The hinge bracket 106 includes a pair of hinge leaves 136, 138 at the lower end of the bracket which cooperate with spaced leaves formed by brackets 98, 100, 102, 104 to define a first hinge couple that permits pivoting about a horizontal axis 105 extending generally in the direction of implement travel to thereby accommodate field contour.

The bracket 106 also includes leaves 131 and 133 which cooperate respectively with the spaced wing section leaves or brackets 130, 132 to define a second couple which has a vertical hinge axis 107. The vertical hinge axis 107 connects or defines a second hinge couple which interconnects the wing section 12 and the bracket 106. In this manner the wing section 12 may pivot about the vertical axis 107 between the positions shown in FIGS. 1 and 2; namely, between a field operating position and a road travel position. Preferably the second hinge couple defining the vertical hinge axis 107 is positioned along a forward beam 144 of the bracket 106. Thus, when the wing section 12 pivots about that vertical axis 107, it may pivot forward to cooperate with the wing support retention member 34.

When pivoting to the position of FIG. 1, each wing section includes a bumper plate 148 which cooperates with a plate 150 on the associated bracket 106 to limit movement. Generally in field operation the plates 148, 150 are bolted together. Then in order to transform the implement into the road travel condition, the bolts are removed. An optional hydraulic cylinder 160 connects the beam 128 to the bracket 106 to effect swinging movement of wing 12 about axis 107.

Operation and Operating Structure

FIG. 1 illustrates the implement in the field operating condition. There the wing sections 12, 14 are extended and folded about the vertical axis 107 of the second hinge couple and retained in position by bolting together plates 148, 150. Movement of the wing section 12 to the field position is effect by hydraulic cylinder 160 which may be operated to swing the wing section 12 about axis 107. When in field operating position, the center carriage 10 is lowered so that center gauge wheels 70, 72, 74, and wing section 124 will rest on the surface of the earth. Lowering of the gauge wheel 70, 72, 74, 124 is effected by raising the carriage wheels 82, 84, 86, 88 once the locking links 135 connecting the bracket 106 to the center carriage 10 are released and the hydraulic cylinder 110 for lifting the wing section 12 is extended. Thus, the wing section 12 may pivot about the first hinge couple or the horizontal axis 105 defined by that couple. As the implement is pulled through the field, the wing sections 12, 14 will follow the contour of the soil as they pivot about the horizontal axis 105 relative to the center carriage section 10. The wing sections 12, 14 may pivot so as to move upward or downward relative to the center carriage section 10 since link 108 is flexible.

In order to transform the assembly into the road travel condition, the hydraulic cylinder 110 and flexible link 108 connecting the carriage section 10 to the wing sections 12, 14 are operated so as to raise the wing sections 12, 14. Permanent locking link 135 may then be attached to hole the wing 12, 14 sections in the elevated position. The wing sections 12, 14 may then be pivoted about the second hinge couple axis 107 to the position shown in FIG. 2. The carriage wheels 82, 84, 86, 88 are then lowered. The implement is then ready for road travel, for storage and ultimately for unfolding in the configuration shown in FIG. 1.

While there has been set forth a preferred embodiment of the invention, it is to be understood that the implement of the invention is limited only by the following claims and their equivalents.

What is claimed is:

1. A folding implement comprising, in combination:
   a center carriage having ground engaging wheels to support the carriage;
   at least one wing section cooperative with and hingedly attached to the carriage for pivoting the wing section between a field travel, extended position substantially transverse to the direction of carriage travel and a road travel, folded position substantially aligned with the direction of carriage travel;
   means for connecting the wing section to the carriage, said means for connecting having an upstanding wing support member and a first hinge connection defining an axis substantially aligned with the direction of carriage travel, said first hinge connection connecting the carriage to the wing support member and defining means for pivoting the wing section to follow the contour of the ground independent of the carriage when the wing section is in the extended position;

said means for connecting further including a second hinge connection defining a substantially upright axis, said second hinge connection connecting the wing section to the wing support member and defining means for pivoting the wing section about the upright axis between the extended position and the folded position; and a flexible linking member connected between the wing support member and the carriage including means for altering the length of the linking member, said linking member controlling the extent of pivotal motion of the wing support member about an axis substantially aligned with the direction of carriage travel and further providing cantilever support for the wing section when the wing section is in the folded position.

2. The implement of claim 1 wherein the first hinge connection is comprised of a pair of horizontally spaced hinges connecting the carriage to the wing support member and the second hinge connection is comprised of a pair of vertically spaced hinges connecting the wing section to the wing support member.

3. The implement of claim 1 including a detachable, fixed length link between the carriage and the wing support member.

4. The implement of claim 1 including a transport support bar on the carriage for cooperative support of the wing section in the road travel, folded position.

5. A folding implement comprising, in combination:
a carriage having running gear, an attached tongue for transport of the carriage, and a tool hitch for support of a farm tool assembly by the carriage;
said running gear attached to the carriage including ground engaging wheels for support thereof during ground transport of the carriage, said running gear including means for raising and lowering the carriage and attached tool assembly;
at least one wing section and associated wing tool assembly, said wing section hingedly attached to the carriage by a hinge assembly for pivoting the wing section between a field travel, extended position substantially transverse to the direction of carriage travel and road travel, folded position substantially aligned with the direction of carriage travel;

said hinge assembly including a first hinge couple having first and second leaves with the first leaf connected to the carriage, and a second hinge couple having first and second leaves with the first leaf connected to the wing section, said second leaves of the couples being connected to an upstanding bracket intermediate the hinge couples, said first hinge couple connected to one side of the bracket and the second hinge couple connected to the opposite side of the bracket, one of said couples defining a pivot axis substantially aligned with the direction of carriage travel for pivoting the wing section to follow the contour of the ground when the wing section is in the extended position, and the other couple defining a substantially upright axis of pivoting the wing section about the upright axis between the extended position and the folded position; and a flexible linkage connecting the bracket to the carriage, said linkage controlling the extent of pivotal movement of the bracket and attached wing section about an axis substantially aligned with the direction of carriage travel and further providing cantilever support for the wing section when the wing section is in the folded position.

6. The implement of claim 5 including a removable fixed link connected between the bracket and the carriage to limit pivotal movement of the bracket and the attached wing section about an axis substantially aligned with the direction of carriage travel.

7. The implement of claim 5 including means for varying the length of the flexible linkage.

8. The implement of claim 5 wherein the first hinge couple comprises at least a pair of horizontally spaced hinges connecting the bracket to the carriage and the second hinge couple comprises at least a pair of vertically spaced hinges connecting the bracket to the wing section.

9. The implement of claim 5 including a wing section attached on each side of the carriage to the carriage by first and second couple means.

* * * * *